US012590688B2

(12) United States Patent
Oyabu et al.

(10) Patent No.: US 12,590,688 B2
(45) Date of Patent: Mar. 31, 2026

(54) VEHICLE LAMP

(71) Applicants: STANLEY ELECTRIC CO., LTD., Tokyo (JP); Honda Motor Co., Ltd., Tokyo (JP)

(72) Inventors: Takashi Oyabu, Tokyo (JP); Yuji Tsuchiya, Wako (JP); Akihiro Kageyu, Wako (JP); Tsuyoshi Takamoto, Wako (JP); Kazuyuki Kawamura, Wako (JP)

(73) Assignees: STANLEY ELECTRIC CO., LTD., Tokyo (JP); HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 19/054,223

(22) Filed: Feb. 14, 2025

(65) Prior Publication Data

US 2025/0264204 A1 Aug. 21, 2025

(30) Foreign Application Priority Data

Feb. 19, 2024 (JP) ................................. 2024-022549

(51) Int. Cl.
*F21S 43/20* (2018.01)
*F21S 43/13* (2018.01)

(52) U.S. Cl.
CPC ............. *F21S 43/265* (2024.05); *F21S 43/13* (2018.01)

(58) Field of Classification Search
CPC ................................ F21S 43/265; F21S 43/13
See application file for complete search history.

(56) References Cited

U.S. PATENT DOCUMENTS

2019/0168660 A1* 6/2019 Na ......................... B60Q 1/381
2019/0168664 A1 6/2019 Tatara et al.
2024/0093860 A1* 3/2024 Baker ............... F21S 43/28135
2024/0210006 A1* 6/2024 Kaup ..................... F21S 43/265
2024/0302015 A1* 9/2024 Muegge ................ F21S 41/663
2025/0022996 A1* 1/2025 Miwa ................... H10H 20/857
2025/0164090 A1* 5/2025 Wei ....................... F21S 41/143

FOREIGN PATENT DOCUMENTS

JP 7045993 B2 4/2022

* cited by examiner

*Primary Examiner* — Christopher E Dunay
(74) *Attorney, Agent, or Firm* — Kenealy Vaidya LLP

(57) ABSTRACT

A vehicle lamp includes: a light-transmitting cover; a semiconductor light-emitting element, wherein light emitted from the semiconductor light-emitting element passes through the light-transmitting cover; a pair of light-shielding walls disposed on both sides of the semiconductor light-emitting element and blocking a portion of the light emitted by the semiconductor light-emitting element; wherein a space is formed between the pair of light-shielding walls and the light-transmitting cover; the light-transmitting cover is subjected to processing for diffusing the light passing through the light-transmitting cover; and when a portion of the light emitted by the semiconductor light-emitting element is blocked by the pair of light-shielding walls and another portion of the light passes through the light-transmitting cover, a segment emission area including an outer shape defined by the pair of light-shielding walls is formed on the light-transmitting cover.

5 Claims, 10 Drawing Sheets

| | HEIGHT OF THE LIGHT -SHIELDING WALL H1=4.67mm | | HEIGHT OF THE LIGHT -SHIELDING WALL H1=5.37mm | | HEIGHT OF THE LIGHT -SHIELDING WALL H1=6.07mm | |
|---|---|---|---|---|---|---|
| | LUMINANCE (cd/m$^2$) | CONTRAST | LUMINANCE (cd/m$^2$) | CONTRAST | LUMINANCE (cd/m$^2$) | CONTRAST |
| LIGHTING MODE 1 | 19400 | - | 18810 | - | 19090 | - |
| LIGHTING MODE 2 | 2697 | 7 | 1583 | 11 | 1263 | 15 |
| LIGHTING MODE 3 | 568 | 34 | 434 | 43 | 365 | 52 |
| LIGHTING MODE 4 | 154 | 125 | 91 | 206 | 72 | 265 |

Fig. 10

VEHICLE LAMP

INCORPORATION BY REFERENCE

This application is based upon and claims the benefit of priority from Japanese patent application No. 2024-22549, filed on Feb. 19, 2024, the disclosure of which is incorporated herein in its entirety by reference.

BACKGROUND

The present disclosure relates to a vehicle lamp.

A vehicle lamp is known (for example, see Patent Literature 1) that functions as a communication lamp for the purpose of communication between a vehicle (for example, a vehicle capable of running in an autonomous driving mode) and an object (for example, a pedestrian or another vehicle) by controlling the lighting state of multiple segment emission areas.

[Patent Literature 1] Japanese Patent No. 7045993

SUMMARY

However, in the vehicle lamp described in Patent Literature 1, the relationship between the multiple reflectors used to form the multiple segment emission areas and the light-transmitting cover is unclear, and there is a problem in that adjacent segment emission areas may overlap or result in other issues, making it impossible to divide light into the intended segment emission areas and emit light from the divided segment emission areas.

The present disclosure has been made in order to solve such problem, and it is an object of the present disclosure to provide a vehicle lamp that, without using additional components (e.g., reflectors or resin lenses) and with a simple configuration, can divide light into the intended segment emission areas and emit light from the divided segment emission areas.

The vehicle lamp according to the present disclosure includes: a light-transmitting cover; a semiconductor light-emitting element, wherein light emitted from the semiconductor light-emitting element passes through the light-transmitting cover; a pair of light-shielding walls disposed on both sides of the semiconductor light-emitting element and blocking a portion of the light emitted by the semiconductor light-emitting element; wherein a space is formed between the pair of light-shielding walls and the light-transmitting cover; the light-transmitting cover is subjected to processing for diffusing the light passing through the light-transmitting cover; and when a portion of the light emitted by the semiconductor light-emitting element is blocked by the pair of light-shielding walls and another portion of the light passes through the light-transmitting cover, a segment emission area including an outer shape defined by the pair of light-shielding walls is formed on the light-transmitting cover.

With such a configuration, it is possible to divide light into the intended segment emission areas and emit light from the divided segment emission areas without using multiple reflectors and with a simple configuration.

Also, in the above-described vehicle lamp, the semiconductor light-emitting element may be a light source with a Lambertian luminous intensity distribution, and the height of the pair of light-shielding walls may be set to block light emitted by the semiconductor light-emitting element within an angular range greater than the half-value angle.

Also, in the above-described vehicle lamp, the distance between the outer shapes of the segment emission area, defined by the pair of light-shielding walls may be longer than the distance between the pair of light-shielding walls.

Also, in the above-described vehicle lamp, the vehicle lamp may include a plurality of combinations of the semiconductor light-emitting element and the pair of light-shielding walls, wherein the combinations may be disposed in a row in a predetermined direction.

Also, in the above-described vehicle lamp, the height of the pair of light-shielding walls may be set such that the segment emission areas are formed in a state where they do not overlap each other.

Also, in the above-described vehicle lamp, the height of the pair of light-shielding walls may be set such that no dark areas are formed between the segment emission areas, which are formed in a state where they are adjacent to each other.

Also, in the above-described vehicle lamp, the height of the pair of light-shielding walls may be set such that dark areas are formed between the segment emission areas, which are formed in a state where they are adjacent to each other.

According to the present disclosure, it is possible to provide a vehicle lamp that, without using additional components (e.g., reflectors or resin lenses) and with a simple configuration, can divide light into the intended segment emission areas and emit light from the divided segment emission areas.

The above and other objects, features and advantages of the present disclosure will become more fully understood from the detailed description given hereinbelow and the accompanying drawings.

and

Figure 1A:
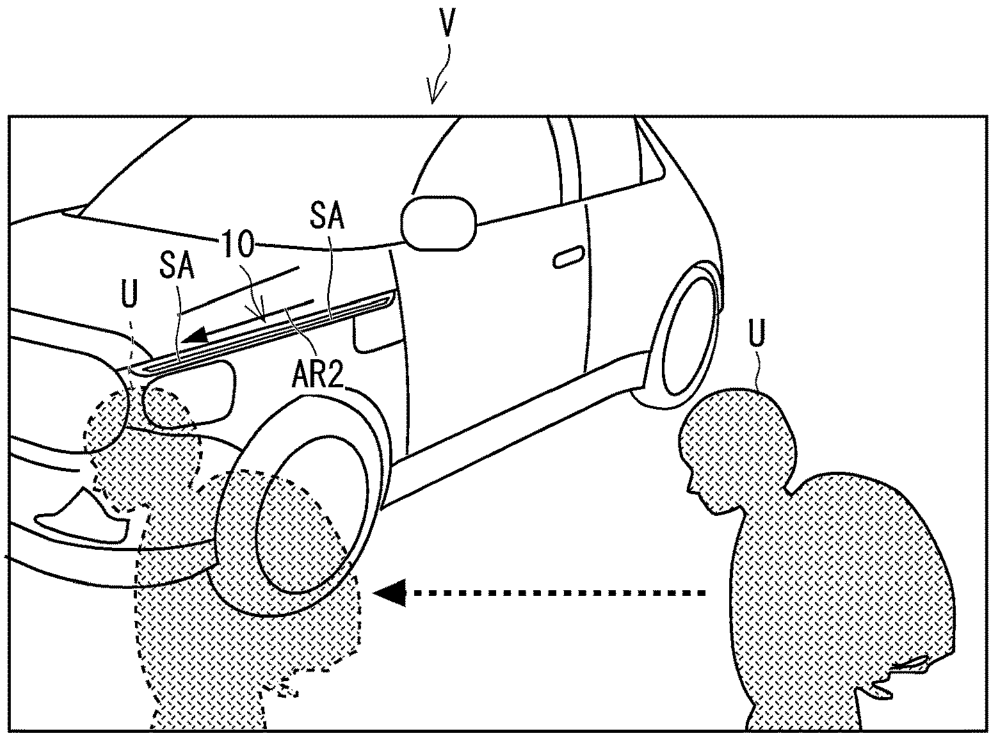
FIG. 1A is a perspective view showing the state in which the vehicle lamp 10 mounted on the vehicle V forms a segment emission area SA.

FIG. 10 is a table summarizing the experimental results (measured results) for each lighting mode and for each height of the light-shielding walls.

DESCRIPTION OF EMBODIMENTS

Hereinafter, a vehicle lamp 10 according to an embodiment of the present disclosure is described below with reference to the accompanying drawings. In the drawings, corresponding components are denoted by the same reference numerals, and the repetitive description is omitted.

Figure 1B:
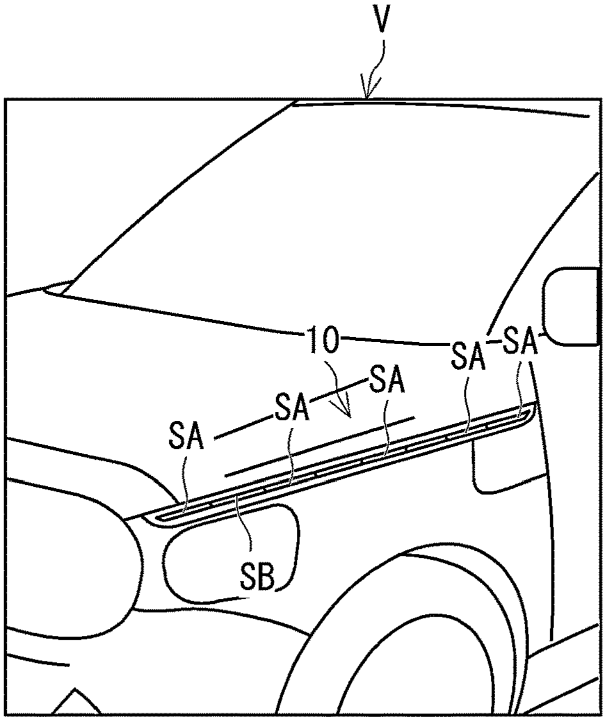
FIG. 1B is a perspective view showing the state in which the vehicle lamp 10 mounted on the vehicle V forms another segment emission area SA.
Figure 2:
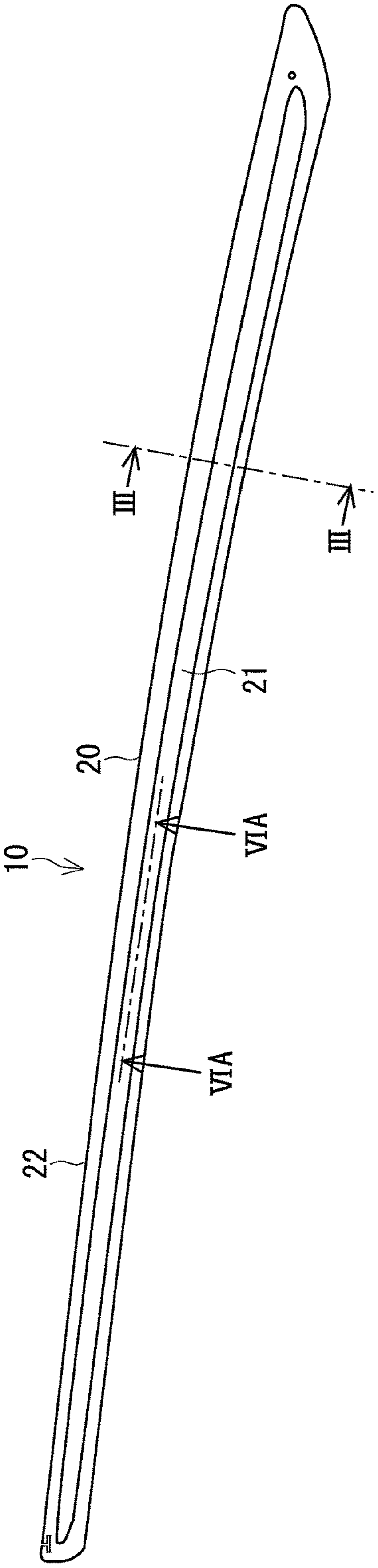
FIG. 2 is a perspective view of the vehicle lamp 10.

FIG. 1A is a perspective view showing the state in which the vehicle lamp 10 mounted on the vehicle V forms a segment emission area SA. FIG. 1B is a perspective view showing the state in which the vehicle lamp 10 mounted on the vehicle V forms another segment emission area SA. FIG. 2 is a perspective view of the vehicle lamp 10.

As shown in FIGS. 1A and 1B, the vehicle lamp 10 is a communication lamp that informs the state (for example, the driving control state of the vehicle V) of the vehicle V (for example, a vehicle capable of running in an autonomous driving mode) on which the vehicle lamp 10 is mounted to the outside (for example, a pedestrian U) of the vehicle V. This is achieved by forming the segment emission area SA which is selectively turned on and off as appropriate.

As shown in FIG. 2, the vehicle lamp 10 is configured to be long and narrow. The vehicle lamp 10 is mounted in a position visible from outside the vehicle V, for example, on the sides (left side and right side) of the vehicle V. At that time, the vehicle lamp 10 is mounted such that its longitudinal direction matches the front-rear direction of the vehicle. The vehicle lamp 10 mounted on the left and right sides are symmetrical in structure. Therefore, the following description will focus on the vehicle lamp 10 mounted on the left side (the left side when facing the front of the vehicle) as a representative.

Figure 3:
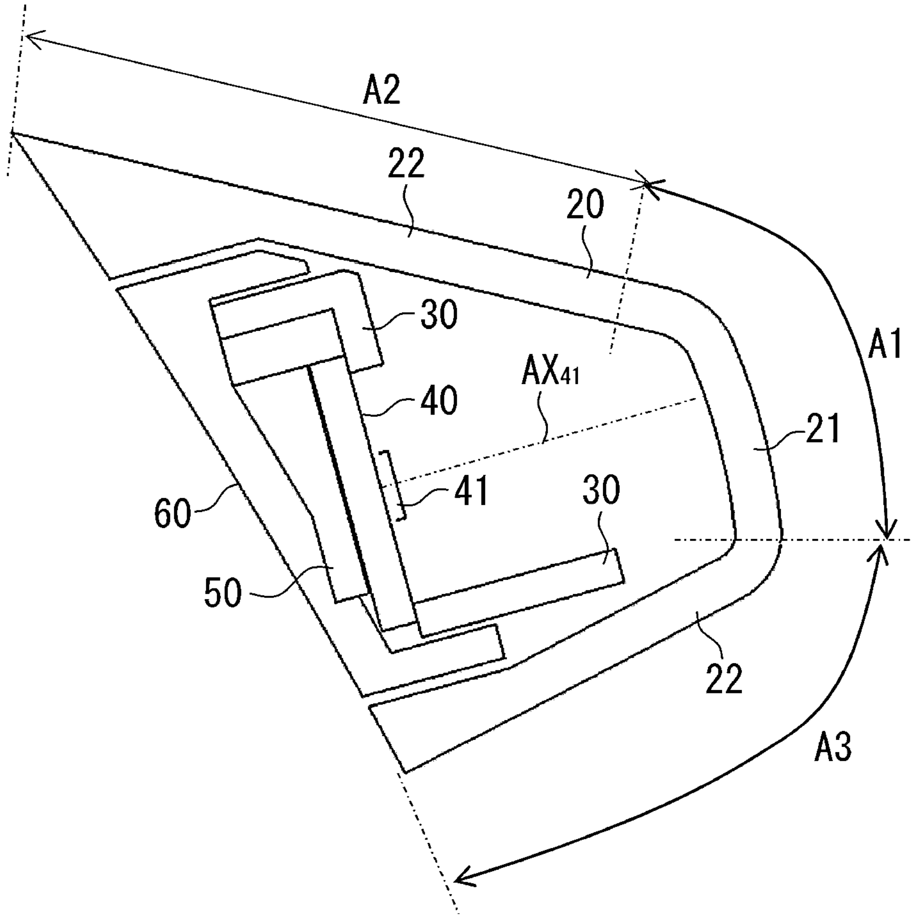
FIG. 3 is a sectional view taken along line III-III in FIG. 2.
Figure 4:
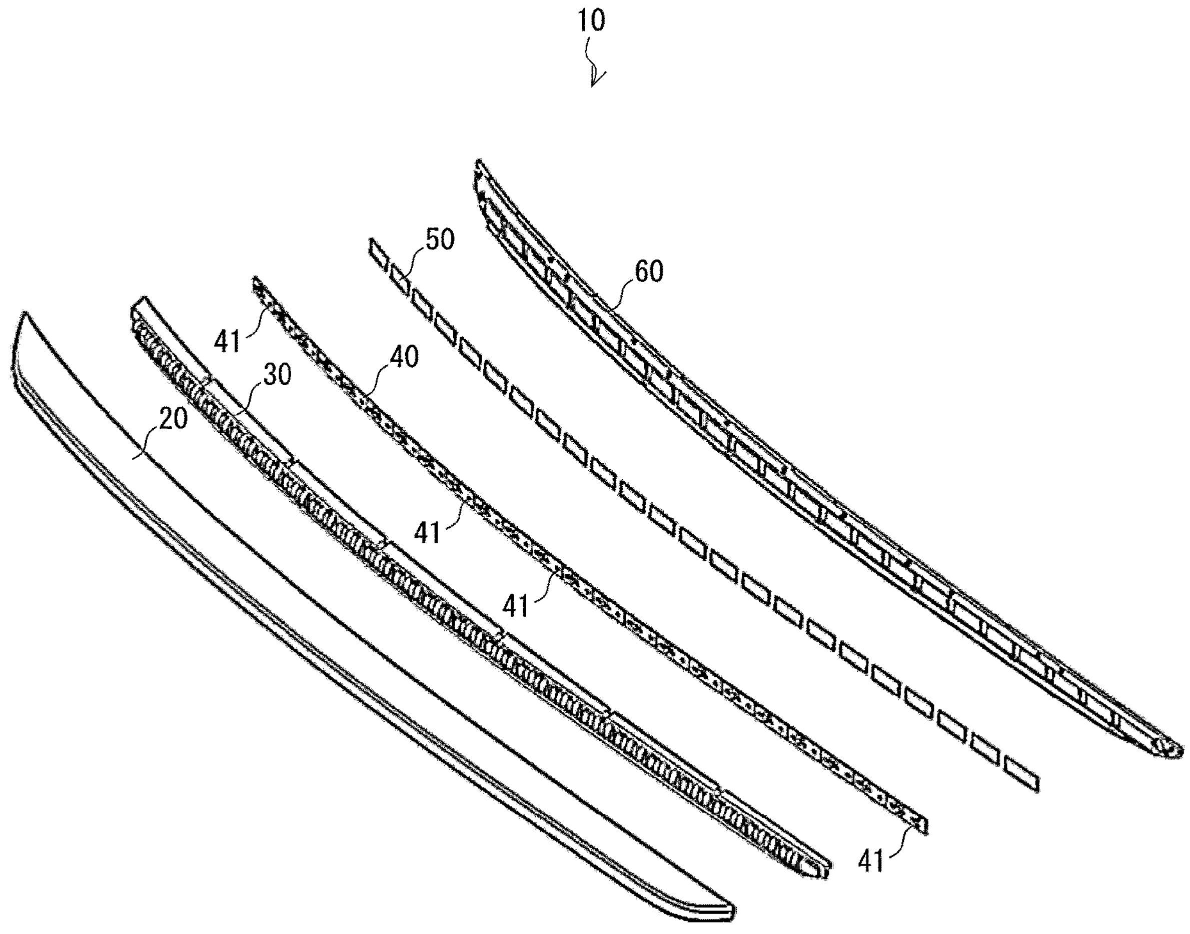
FIG. 4 is an exploded perspective view of the vehicle lamp 10.

FIG. 3 is a sectional view taken along line III-III in FIG. 2. FIG. 4 is an exploded perspective view of the vehicle lamp 10.

As shown in FIGS. 3 and 4, the vehicle lamp 10 includes an outer lens 20, a housing 30, a substrate 40 on which a semiconductor light-emitting element 41 is mounted, a heat dissipation sheet 50, and a case 60.

The outer lens 20 is a long and narrow light-transmitting cover made of transparent resin, such as acrylic or polycarbonate. The outer lens 20 includes a light-transmitting part 21 and a light-non-transmitting part 22.

The light-transmitting part 21 is a portion through which light emitted by the semiconductor light-emitting element 41 passes. The light-transmitting part 21 is provided in the range indicated by reference sign A1 in FIG. 3. At least one of the front and rear surfaces of the light-transmitting part 21 is subjected to processing for diffusing light transmitting through the light-transmitting part 21, for example, coating for giving a frosted glass appearance to at least one of the front and rear surfaces. Alternatively, the processing for diffusing light passing through the light-transmitting part 21 may employ texturing, a diffusion sheet, or similar methods instead of the coating.

The light-non-transmitting part 22 is provided so as to surround the light-transmitting part 21. The light-non-transmitting part 22 is provided in the ranges indicated by reference signs A2 and A3 in FIG. 3. The light-non-transmitting part 22 is provided to cover and conceal the internal structure of the vehicle lamp 10, preventing it from being visible from the outside. For example, the light-non-transmitting part 22 is formed by applying a black or other light-non-transmitting color coating to at least one of the front and rear surfaces of the outer lens 20.

Figure 5:
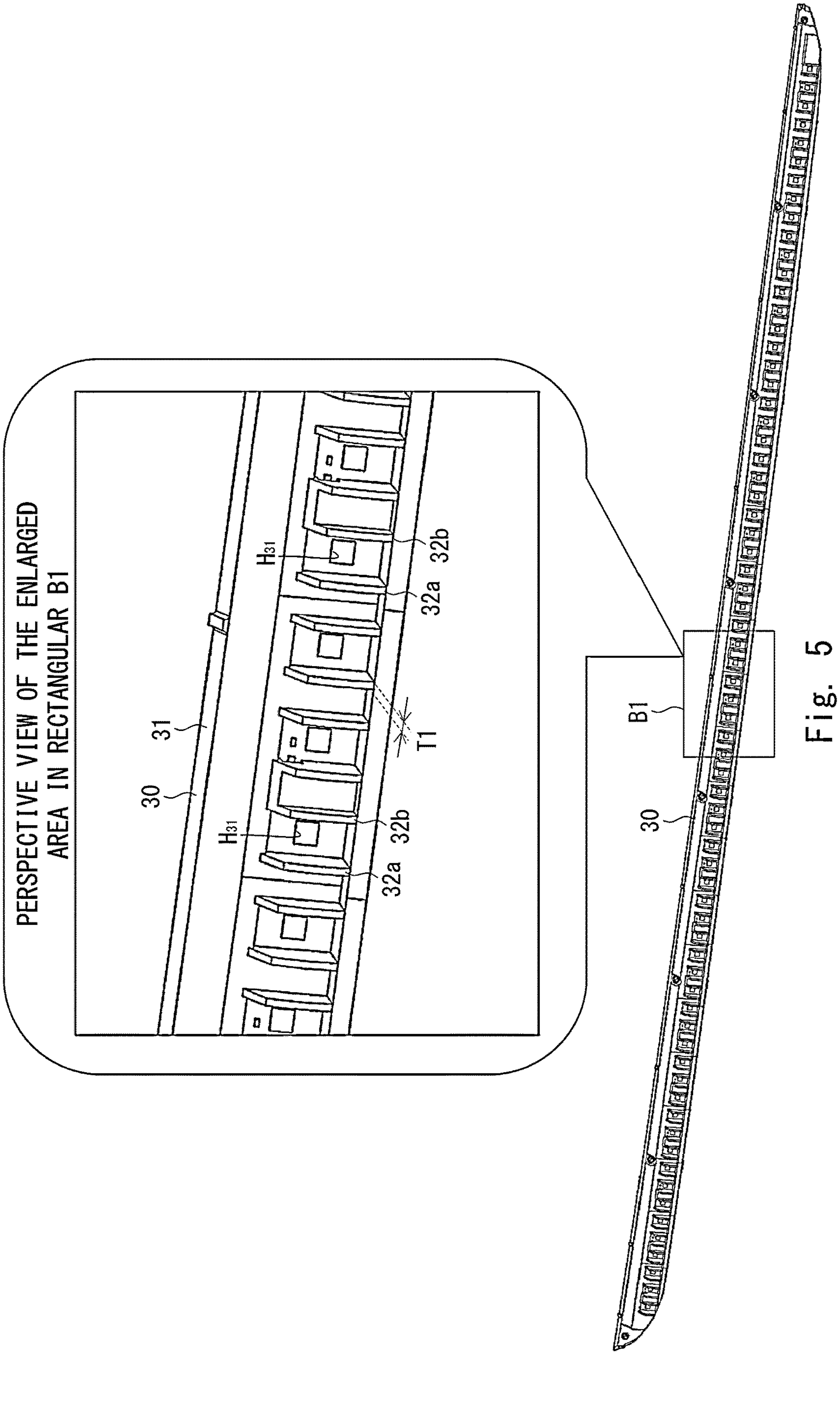
FIG. 5 is a perspective view of the housing 30.

FIG. 5 is a perspective view of the housing 30.

As shown in FIG. 5, the housing 30 includes a housing body 31 and light-shielding walls 32 (a pair of light-shielding walls 32*a* and 32*b*). The housing body 31 and the light-shielding walls 32 (32*a* and 32*b*) are integrally molded. Alternatively, the housing 30 may be configured by combining a separately formed housing body 31 and the light-shielding walls 32 (32*a* and 32*b*). The housing 30 is made, for example, of black synthetic resin (for example, polypropylene containing carbon).

The housing body 31 is formed to be long and narrow, corresponding to the long and narrow outer lens 20 (see FIG. 4). A plurality of rectangular through-holes $H_{31}$ are formed in a row in the housing body 31 at predetermined intervals along the longitudinal direction of the housing body 31. The through-holes $H_{31}$ penetrate the front and rear surfaces of the housing body 31. Each semiconductor light-emitting element 41 mounted on the substrate 40 disposed behind the housing body 31 is exposed through the respective through-holes $H_{31}$.

The light-shielding walls 32 (32*a* and 32*b*) are provided on the front surface of the housing body 31 (see FIG. 5). Specifically, the light-shielding walls 32 (32*a* and 32*b*) are plate-like parts with a thickness T1 (see FIG. 5) in the longitudinal direction of the housing body 31 and are provided on both sides of the through-hole $H_{31}$ with respect to the longitudinal direction of the housing body 31. The light-shielding walls 32 (32*a* and 32*b*) are an example of the pair of light-shielding walls in the present disclosure.

The combination of the through-hole $H_{31}$ and the light-shielding walls 32 (32*a* and 32*b*), configured as described above, is disposed in a row at predetermined intervals along the longitudinal direction of the housing body 31.

Figure 6A:
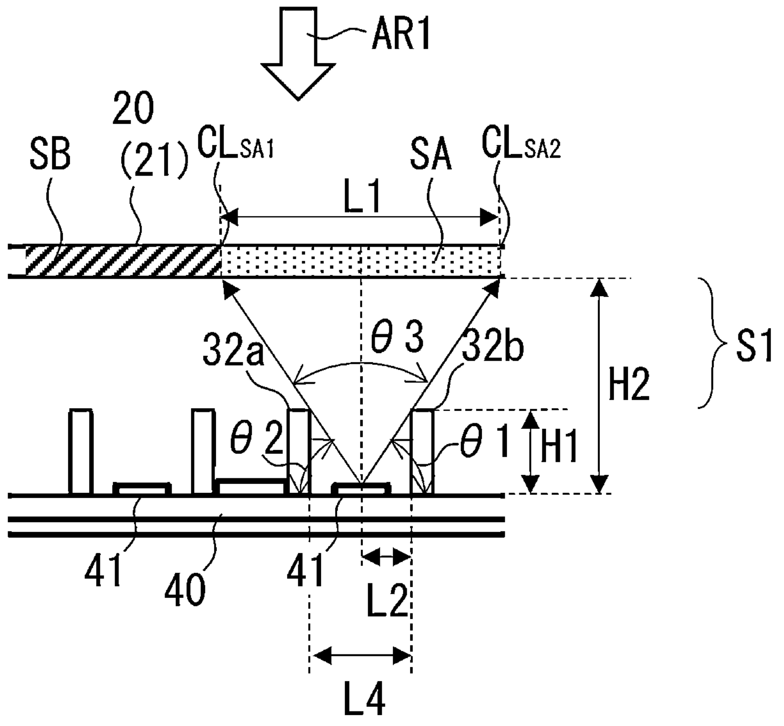
FIG. 6A is a sectional view taken along line VIA-VIA in FIG. 2.

FIG. 6A is a sectional view taken along line VIA-VIA in FIG. 2.

As shown in FIG. 6A, a space S1 is formed between the outer lens 20 (light-transmitting part 21) and the light-shielding walls 32 (32*a* and 32*b*). As a result, it is possible to make the distance L1 between the outer shapes of the segment emission area SA, defined by the light-shielding walls 32*a* and 32*b*, longer than the distance L4 between the light-shielding walls 32*a* and 32*b*.

The substrate 40 is formed to be long and narrow, corresponding to the long and narrow housing 30 (see FIG. 4). The substrate 40 is attached to the case 60 in a state where the rear surface, opposite to the front surface on which the semiconductor light-emitting element 41 is mounted, faces the front surface of the metal case 60 (for example, made of aluminum) (see FIG. 3). The heat dissipation sheet 50 (thermal conductive sheet) is provided between the rear surface of the substrate 40 and the front surface of the case 60 to enhance the adhesion between the substrate and the case and reduce thermal contact resistance. Note that instead of the heat dissipation sheet 50, other TIMs (Thermal Interface Materials), such as thermal grease or thermal conductive adhesive, may also be used.

The semiconductor light-emitting element 41 is a light source with a Lambertian luminous intensity distribution, and is, for example, an LED emitting amber light. Note that the emission color of the semiconductor light-emitting element 41 may be other than amber. The semiconductor light-emitting element 41 has a light-emitting surface (for example, a rectangular light-emitting surface of 1 mm square). The semiconductor light-emitting elements 41 are disposed in a row at predetermined intervals along the longitudinal direction of the substrate 40. The substrate 40 is disposed behind the housing 30 and fixed to the case 60 in a state where each semiconductor light-emitting element 41 is exposed through the respective through-hole $H_{31}$, that is, in a state where the semiconductor light-emitting elements 41 (light-emitting surfaces) exposed through the respective through-holes $H_{31}$ and the outer lens 20 (light-transmitting part 21) face each other (see FIG. 3).

Next, the segment emission area SA will be described.

Figure 6B:
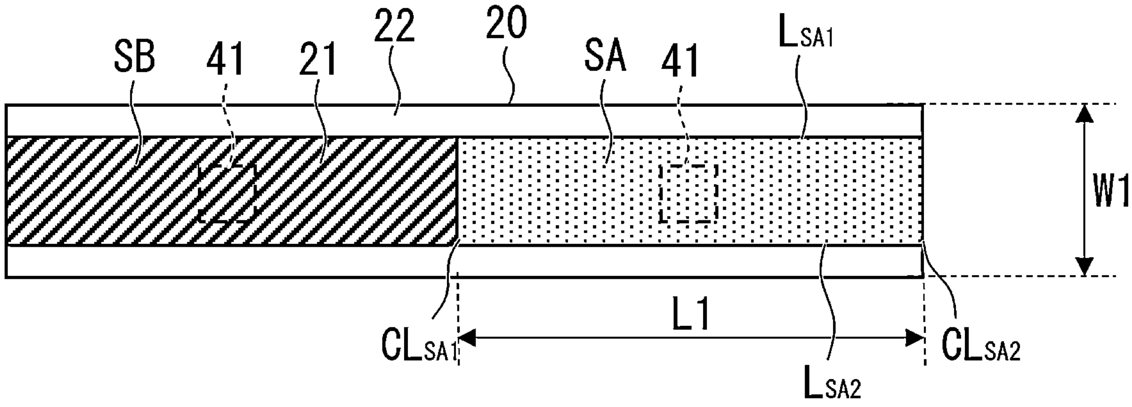
FIG. 6B is a view seen in the direction of arrow AR1 in FIG. 6A.

FIG. 6A is a diagram showing the state where the segment emission area SA is formed on the outer lens 20 (light-transmitting part 21) by lighting the semiconductor light-emitting element 41. FIG. 6B is a view seen in the direction of arrow AR1 in FIG. 6A. In FIGS. 6A and 6B, the hatched area indicated by reference sign SA represents the segment emission area, and the hatched area indicated by reference sign SB represents the non-emitting dark area. The same applies to other figures.

When the semiconductor light-emitting element 41 is turned on, a portion of the light emitted by the semiconductor light-emitting element 41 (for example, light within angles θ1 and θ2 in FIG. 6A, which is relatively weaker in intensity) is blocked by the light-shielding walls 32 (32*a* and 32*b*), while another portion of the light (for example, light within angle θ3 in FIG. 6A, which is relatively stronger in intensity) passes through the outer lens 20 (light-transmitting part 21). At that time, since the outer lens 20 (light-transmitting part 21) is subjected to processing for diffusing light passing through the light-transmitting part 21, when another portion of the light (relatively stronger in intensity) passes through the outer lens 20 (light-transmitting part 21), a segment emission area SA is formed on the outer lens 20 (light-transmitting part 21).

As shown in FIG. 6B, the segment emission area SA is a rectangular area with a length L1 in the longitudinal direction and a width W1 in the lateral direction. The outer shape of the segment emission area SA is a shape defined by the light-shielding walls 32 (32*a* and 32*b*), which, in this case, includes two straight-line shapes $CL_{SA1}$ and $CL_{SA2}$ (light-dark boundary lines) extending in the lateral direction. In addition, the outer shape of the segment emission area SA is a shape defined by the light-non-transmitting part 22 which is provided to surround the light-transmitting part 21, which, in this case, includes two straight-line shapes $L_{SA1}$ and $L_{SA2}$ extending in the longitudinal direction. In this way, the segment emission area SA is formed as an area (in this case, a rectangular area) enclosed by the two straight-line shapes $CL_{SA1}$ and $CL_{SA2}$ and the two straight-line shapes $L_{SA1}$ and $L_{SA2}$.

The length L1 of the segment emission area SA in the longitudinal direction can be adjusted by adjusting the height H1 of the light-shielding walls 32 (32*a* and 32*b*).

Figure 7A:
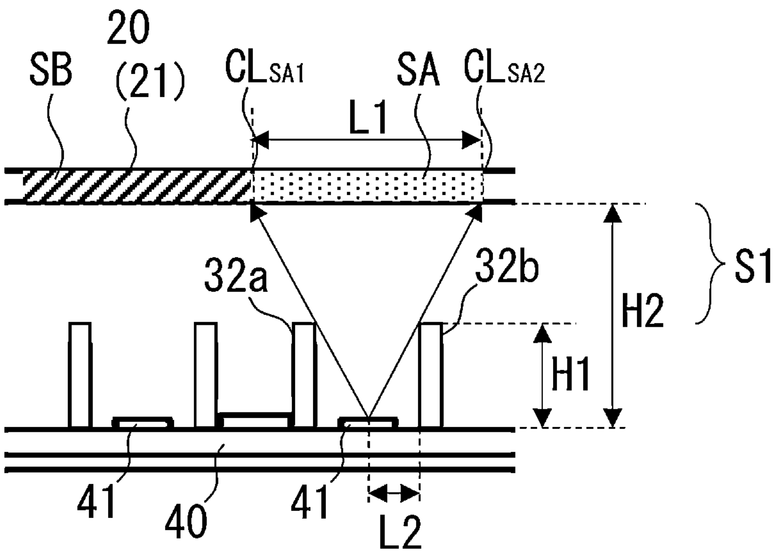
FIG. 7A shows an example of the segment emission area SA when the height H1 of the light-shielding walls 32 (32*a* and 32*b*) is adjusted to 5.37 mm.
Figure 7B:
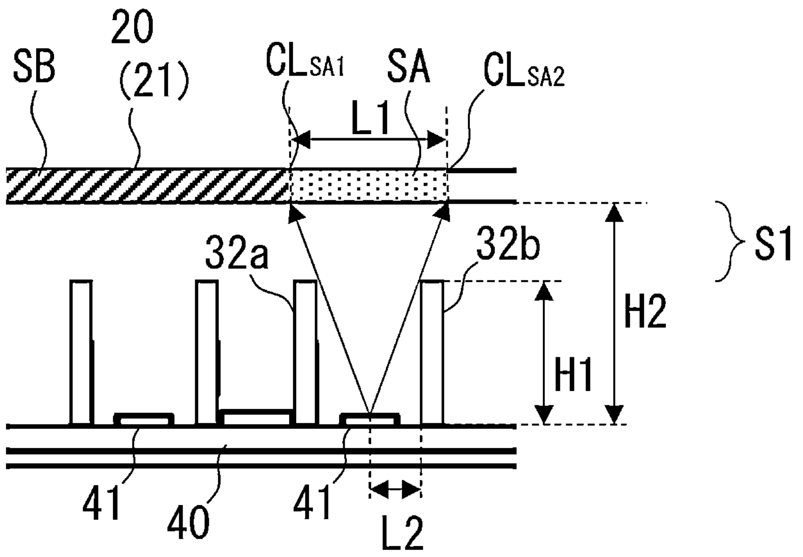
FIG. 7B shows an example of the segment emission area SA when the height H1 of the light-shielding walls 32 (32*a* and 32*b*) is adjusted to 6.07 mm.

FIG. 6A shows an example of the segment emission area SA when the height H1 of the light-shielding walls 32 (32*a* and 32*b*) is adjusted to 4.67 mm. FIG. 7A shows an example of the segment emission area SA when the height H1 of the light-shielding walls 32 (32*a* and 32*b*) is adjusted to 5.37 mm. FIG. 7B shows an example of the segment emission area SA when the height H1 of the light-shielding walls 32 (32*a* and 32*b*) is adjusted to 6.07 mm.

Referring to FIGS. 6, 7A, and 7B, it can be observed that as the height H2 of the light-shielding walls 32 (32*a* and 32*b*) increases, the length L1 of the segment emission area SA in the longitudinal direction decreases.

Figure 8A:
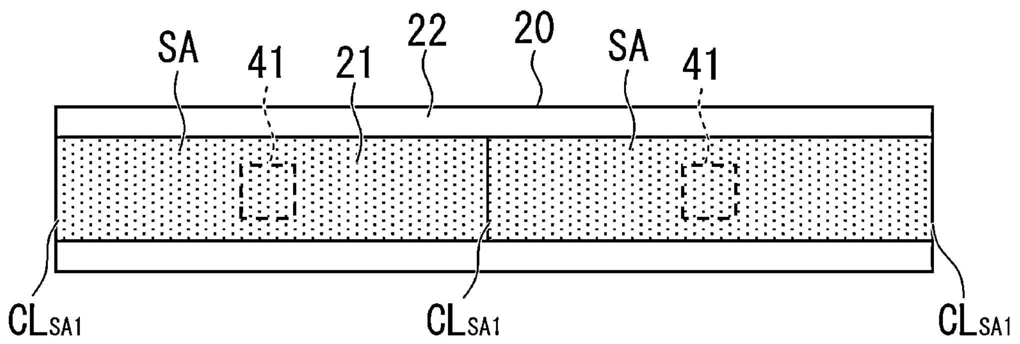
FIG. 8A is an example of segment emission areas SA (multiple)
Figure 8B:
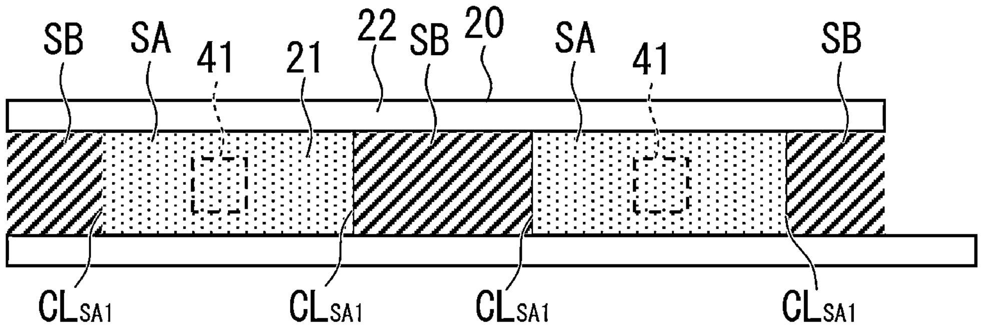
FIG. 8B is another example of segment emission areas SA (multiple)

FIG. 8A is an example of segment emission areas SA (multiple), and FIG. 8B is another example of segment emission areas SA (multiple).

For example, by adjusting the height H2 of the light-shielding walls 32 (32*a* and 32*b*), as shown in FIG. 8A, it is possible to form multiple segment emission areas SA in a state where they are adjacent to each other without gaps (dark areas SB) and without overlapping each other. Additionally, by adjusting the height H2 of the light-shielding walls 32 (32*a* and 32*b*), as shown in FIG. 8B, it is also possible to form multiple segment emission areas SA in a state where they are adjacent to each other with gaps (dark areas SB) in between.

The height H2 of the light-shielding walls 32 (32*a* and 32*b*) is desirably set to block light emitted by the semiconductor light-emitting element 41 within an angular range greater than the half-value angle (for example, the range of angles θ1 and θ2 in FIG. 6A). In this way, it is possible to form a brighter segment emission area SA.

Next, the experimental results conducted by the inventors of the present invention will be described.

Figure 9:
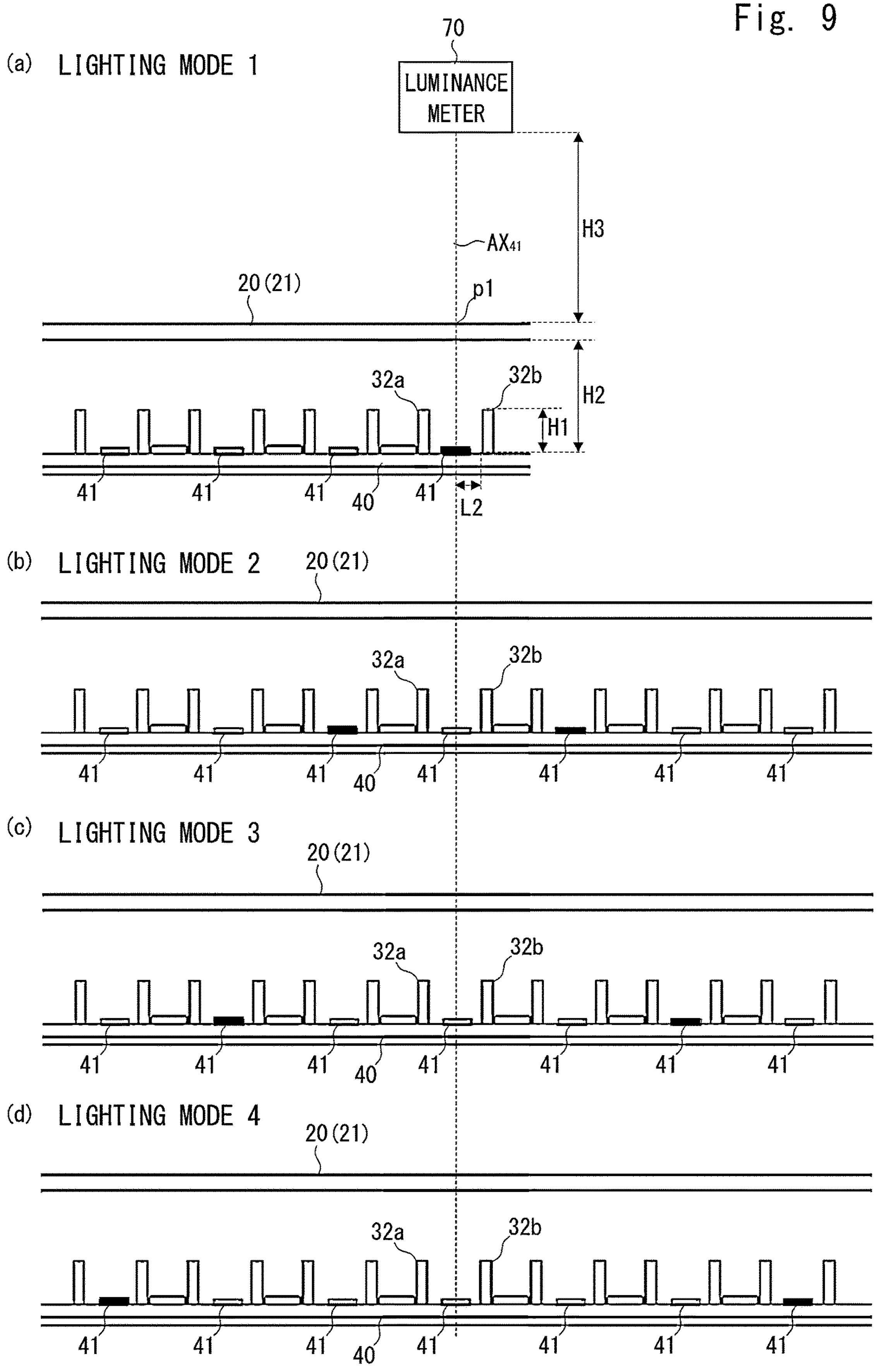
FIG. 9 is a diagram illustrating the lighting modes used in the experiments.

FIG. 9 is diagrams illustrating the lighting modes used in the experiments.

In the experiment, in a darkroom, the luminance and contrast at measurement point p1 were measured using a luminance meter 70 each time the semiconductor light-emitting elements 41 disposed at different positions were turned on in the lighting modes shown in FIGS. 9(*a*) to 9(*d*). In FIG. 9, the semiconductor light-emitting elements 41 filled in black indicate that they are turned on, while the semiconductor light-emitting elements 41 filled in white indicate that they are turned off. As shown in FIG. 9(*a*), measurement point p1 is the location where the optical axis $AX_{41}$ of a specific semiconductor light-emitting element 41 intersects the outer lens 20 (light-transmitting part 21). The distance H2 between the outer lens 20 (light-transmitting part 21) and the semiconductor light-emitting element 41 is 14.5 mm, and the distance L2 between the optical axis $AX_{41}$ of the semiconductor light-emitting element 41 and the light-shielding walls 32 (32*a* and 32*b*) is 3 mm. The luminance meter 70 was disposed at a position separated by a distance H3 in the normal direction from measurement point p1. The distance H3 is 600 mm.

FIG. 10 is a table summarizing the experimental results (measured results) for each lighting mode and for each height of the light-shielding walls.

Referring to FIG. 10, it can be observed that as the height H2 of the light-shielding walls 32 (32*a* and 32*b*) increases, the contrast improves.

The segment emission area SA may be formed to move from the rear side to the front side of the vehicle (or in the reverse direction) by controlling the on/off states of each semiconductor light-emitting element 41 (see arrow AR2 in FIG. 1A). The segment emission area SA and the dark areas SB may also be formed to alternate continuously (see FIG. 1B). Furthermore, the segment emission area SA may be formed in various other patterns.

As described above, according to this embodiment, it is possible to divide light into the intended segment emission areas and emit light from the divided segment emission areas without using additional components (e.g., reflectors or resin lenses) and with a simple configuration (light-shielding walls 32 (32*a* and 32*b*)). In this case, it is also possible to achieve high efficiency and higher contrast in the segment emission areas SA.

The numerical values described in the above-described embodiments are all illustrative, and appropriate numerical values different from the numerical values described in the above-described embodiments can be used as a matter of course.

The above-described embodiments are merely illustrative in all aspects.

The present disclosure is not limitedly interpreted by the description of the above-described embodiments. The present disclosure can be implemented in other various forms without departing from the spirit or main features of the present disclosure.

What is claimed is:

1. A vehicle lamp comprising:

a light-transmitting cover;

a semiconductor light-emitting element, wherein light emitted from the semiconductor light-emitting element passes through the light-transmitting cover;

a pair of light-shielding walls disposed on both sides of the semiconductor light-emitting element and blocking a portion of the light emitted by the semiconductor light-emitting element; wherein a space is formed between the pair of light-shielding walls and the light-transmitting cover;

the light-transmitting cover is subjected to processing for diffusing the light passing through the light-transmitting cover;

when a portion of the light emitted by the semiconductor light-emitting element is blocked by the pair of light-shielding walls and another portion of the light passes through the light-transmitting cover, a segment emission area including an outer shape defined by the pair of light-shielding walls is formed on the light-transmitting cover; and a plurality of combinations of the semiconductor light-emitting element and the pair of light-shielding walls, wherein the combinations are disposed in a row in a predetermined direction, wherein the height of the pair of light-shielding walls is set such that the segment emission areas are formed in a state where they do not overlap each other.

2. The vehicle lamp according to claim 1, wherein the semiconductor light-emitting element is a light source with a Lambertian luminous intensity distribution, and the height of the pair of light-shielding walls is set to block light emitted by the semiconductor light-emitting element within an angular range greater than the half-value angle.

3. The vehicle lamp according to claim 1, wherein the distance between the outer shapes of the segment emission area, defined by the pair of light-shielding walls is longer than the distance between the pair of light-shielding walls.

4. The vehicle lamp according to claim 1, wherein the height of the pair of light-shielding walls is set such that no dark areas are formed between the segment emission areas, which are formed in a state where they are adjacent to each other.

5. The vehicle lamp according to claim 1, wherein the height of the pair of light-shielding walls is set such that dark areas are formed between the segment emission areas, which are formed in a state where they are adjacent to each other.

* * * * *